Jan. 31, 1950

L. T. SACHTLEBEN
VARIABLE LENGTH OPTICAL SYSTEMS
WITHOUT CHANGE OF MAGNIFICATION
Filed June 30, 1948

2,496,069

INVENTOR
LAWRENCE T. SACHTLEBEN
BY
ATTORNEY

Patented Jan. 31, 1950

2,496,069

UNITED STATES PATENT OFFICE 2,496,069

VARIABLE LENGTH OPTICAL SYSTEM WITHOUT CHANGE OF MAGNIFICATION

Lawrence T. Sachtleben, Haddonfield, N. J., assignor to Radio Corporation of America, a corporation of Delaware Application June 30, 1948, Serial No. 35,995

4 Claims. (Cl. 88—57)

This invention relates to relay optical systems and, more particularly, to methods for increasing the length of a relay optical system of two stages, without a change in the magnification of either stage, by the introduction of two additional lens systems, and to permit the overall length of the system to be independently varied by changes in only one of the additional lens systems.

In an optical system such, for example, as is commonly used in sound film recording, it may be desirable to vary the distance between lenses without disturbing either the optical speed or the degree of magnification of the system in order to adapt the system to a particular camera or recording sound head. This, of course, cannot be done in any known manner by simply changing the relative positions of the lenses in the system.

An object of the present invention is to provide a method of varying the length of a two stage relay optical system without a change in the magnification of either stage and without any substantial change in the optical speed of the system.

Another object of the present invention is to provide a method of varying the length of a two stage relay optical system by a desired amount without a change in the magnification of either stage, by the introduction of two additional lens systems.

Figure 1:
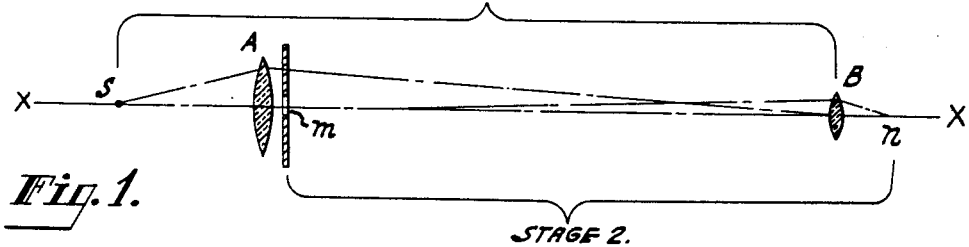
Figure 2:
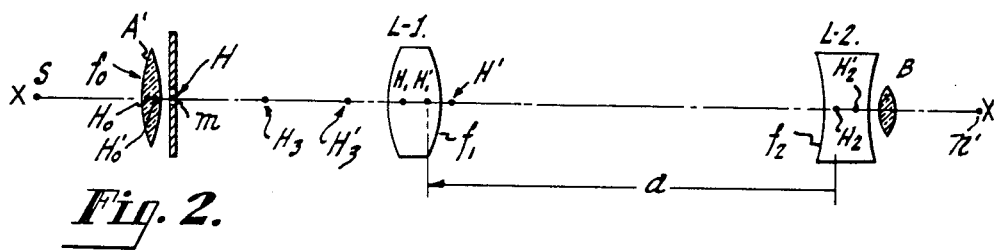
Figure 3:
Figure 4:
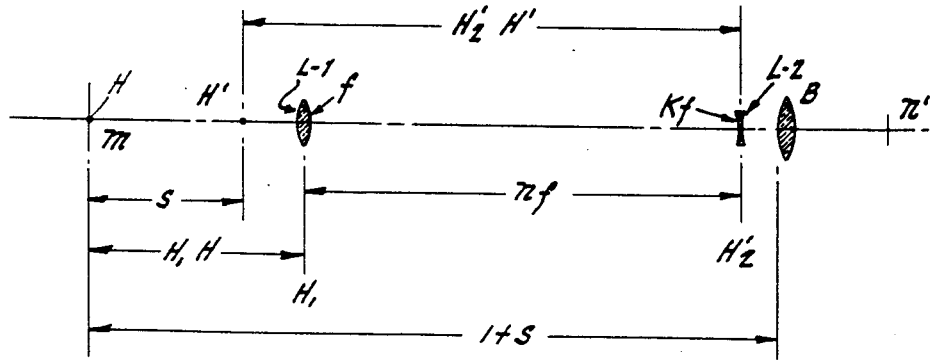

These and other objects will be more apparent and the invention will be better understood from the following specification when taken in connection with the drawings of which:

Fig. 1 is a diagrammatic cross section view of a typical two stage relay optical system, Fig. 2 is a diagrammatic view, partly in section, of the system of Fig. 1 with two lens systems added as taught in the present invention, Fig. 3 is a diagrammatic cross section view of stage 2 of Fig. 1 with the object distance taken as unity, and Fig. 4 is a diagrammatic view of the system of Fig. 3 which has been lengthened by adding lens systems according to the present invention.

Referring more particularly to Fig. 1, a two stage relay optical system comprises a source, or object point, S that is imaged by a positive lens A upon a lens B. An object such as an aperture $m$ of arbitrary configuration, situated at lens A, is, in turn, imaged at $n$ by lens B. Such a system is used in sound recording optical systems in which S is the mirror of a vibrating galvanometer that serves as a secondary source of light, $m$ is a slit in a plate perpendicular to the axis X—X, $n$ is a light sensitive film moving parallel to the plate containing the slit $m$, A is a positive lens that produces a real image of S in lens B, and B is a positive lens that produces a real image of slit $m$ at $n$. Slit $m$ and lens A are substantially coincident. This system is divisible into two stages, stage 1 of which includes the source S, the lens A and the image of S at lens B, and stage 2 of which includes slit $m$, lens B and image $n$.

The main problem solved by the present invention was to increase the distance between slit $m$ and film $n$ without changing the size or quality of the image at $n$, and without changing the amount of light entering lens B (except possibly by a small amount equal to the surface reflection losses that normally result from the introduction of additional lenses into an optical system and this can be minimized by well known surface treatments).

Any lens combination has two principal planes, sometimes called "unit planes" because it is one of their characteristics that an object in one unit plane of a lens combination is imaged virtually at the second unit plane, the magnification being unity. The virtual image is also upright.

As far as imagery in stage 2 is concerned, part of the problem can be solved, according to the present invention, by introducing a lens combination between lenses A and B such that the first principal plane of the combination is at the slit $m$, and the second principal plane is displaced from it a distance equal to the desired increase in the length of the optical system, in the direction of lens B. The slit $m$ will then be imaged virtually at the second principal plane of the introduced combination, without suffering any change in size, and the lens B can be moved away from slit $m$ a distance equal to the separation of the two principal planes, at which new location the virtual image of the slit will be spaced from B a distance equal to the original distance of slit $m$ from lens B. The size of the final image of the slit that is formed by lens B will, therefore, be unchanged by the increase in overall length of the system, and its distance from lens B will also be unchanged.

A general illustration of a lens combination that may be introduced in order to effect the objects of the invention will now be explained with reference to Fig. 2.

The new lens combination that is introduced may be made up of lenses L—1 and L—2, which combination has principal planes at H and H'. H coincides with slit $m$, and the slit is imaged virtually at H' by the combination of lenses L—1 and L—2. The lens B and slit image $n'$ are farther from slit $m$, than shown in Fig. 1, by the distance HH'.

The optical speed of the system will be unchanged by the presence of the new lens combination provided that the image of the mirror S in lens B is the same size in the optical system of Fig. 2 as in that of Fig. 1. If it is considered that the principal planes $H_0$ and $H_0'$ of lens A are substantially coincident with the point H, then the location of the principal planes of the combination of the three lenses A', L—1 and L—2 can be determined by the well known formulas:

$$H_0H_3 = \frac{H_0'H \times f_3}{f_{1,2}}$$

$$H'H_3' = \frac{-H_0'H \times f_3}{f_0}$$

(See Hardy and Perrin, "Principles of Optics," McGraw-Hill Book Co., New York, 1932, Ch. IV, pp. 59–61.) Where $H_3$ is the first principal plane and $H_3'$ is the second principal plane of the combination of all three lenses together, $f_3$ is the focal length of the three lens combination, $f_{1,2}$ is the focal length of the combination of lenses L—1 and L—2, and $f_0$ is the focal length of lens, A'.

If $H_0$, $H_0'$ and H are substantially coincident, then $H_0'H =$ substantially zero, and the principal planes $H_3$ and $H_3'$ of the three lens combination are substantially identical with the principal planes H and H' of the combination of lenses 1 and 2, because $H_0H_3=0$ and $H'H_3'=0$. (For purposes of illustration, these principal planes have not been shown to coincide in the drawings, however.)

In view of the substantial coincidence of $H_0,H_0'$ and H, the positions of the principal planes of the three lens combination are also independent of the focal length, $f_0$, of lens A'. If it is now noted that in Fig. 1, where lens A focuses mirror S in lens B, the object distance is substantially $Sm$ and the image distance is $mB$, while, in Fig. 2, lens A', taken together with lenses L—1 and L—2, focuses mirror S in lens B where the object distance is SH (which is equal to $Sm$), and the image distance H'B is equal to $mB$ (Fig. 1), it is seen that the magnification of the image of mirror S in lens B is substantially the same in both Figs. 1 and 2.

The above constitutes a general demonstration of the solution of the problem of lengthening the optical system without changing either the speed of the system or the size of the image.

It will next be shown how the problem is solved in terms of the relation between the desired increase in system length (HH') and the focal lengths of lenses L—1 and L—2 and the space "$a$" between the lenses. This is most readily done to a substantially accurate approximation if lenses L—1 and L—2 are assumed to be thin lenses.

Fig. 3 represents stage 2 of Fig. 1, object $m$ being imaged at $n$ by lens B. The distance from $m$ to the anterior vertex of lens B (or to the nearest point to lens B at which another lens can be mounted) is taken as unity. In Fig. 4, let the unit distance from $m$ to B be increased by the distance (S units) by which it is desired to increase the length of the optical system. By previous definition this distance S also equals HH', the distance between the two principal planes of the lens combination to be added.

Two thin lenses, L—1 and L—2, may then be placed between object $m$ and objective lens B.

Let the focal length of lens L—1 be $f$ units. The focal length of lens L—2 may then be stated as $Kf$ units and the distance between L—1 and L—2 may be defined as $nf$ units. K may thus be defined as the ratio of the focal length of lens L—2 to the focal length of lens L—1 and $n$ may be defined as the ratio of the distance between the two lenses to the focal length of L—1.

By previous definition, the first principal plane of this added lens combination must be at the object $m$ and the second principal plane, H', is spaced S units from it.

The distance from the object $m$ to lens L—1 may then be defined as $-H_1H$ (where $H_1$ is one of the principal planes of lens —1). The distance from H' to the anterior vertex of lens B (or the nearest point to lens B at which another lens such as L—2 may be mounted) may be defined as unity and, therefore, the solution to the problem is obviously limited by the requirements that $-H_2'H' \leqq 1$ and $H_2'H' < S$.

The focal length of the added thin lens combination is then $$F = \frac{Kf^2}{f+Kf-nf} = \frac{Kf}{1+K-n} \text{ units (referred to } mB=1\text{)}$$

$$H_1H = \frac{nf}{Kf} \times F = \frac{nf}{1+K-n} \text{ units (referred to } mB=1\text{)}$$

$$H_2'H' = -\frac{nf}{f} \times F = -$$

$$\frac{nKf}{1+K-n} \text{ units (referred to } mB=1\text{)}$$

$$HH' = S = (nf - H_1H + H_2'H')$$

$$= nf - \frac{nf}{1+K-n} - \frac{nKf}{1+K-n} \text{ units (referred to } mB=1\text{)}$$

$$S = nf\left(1 - \frac{1+K}{1+K-n}\right) \text{ units (referred to } mB=1\text{)}$$

$$S = nf\left(\frac{1+K-n-1-K}{1+K-n}\right) \text{ units (referred to } mB=1\text{)}$$

$$S = nf\left(\frac{-n}{1+K-n}\right) \text{ units (referred to } mB=1\text{)}$$

$$S = \frac{-n^2 f}{1+K-n} \text{ units (referred to } mB=1\text{)}$$

A second limit to the solution, in the case of lengthening the two stage relay optical system, is set by the obvious requirement that only positive values of S or HH' are acceptable.

Thus, for a given value of $S>0$, and for each of a series of assumed values of $f$ that may have either sign ($+$ or $-$), it is possible to find the range of values of K and $n$ for which $$S = \frac{-n^2 f}{1+K-n}$$

subject to the following additional limitations:

(1) When $f$ is positive, $n$ must be $>(1+K)$ (2) When $f$ is negative, $n$ must be $<(1+K)$ (3) $\frac{nKf}{1+K-n}$ must be $\leqq 1$ and also $H_2'H' < S$.

*Example*

Suppose it is desired to increase the length of a two stage relay optical system by about 2.1 inches, where the distance from slit $m$ to lens B is originally 4.2 inches.

If a thin positive lens L—1 is selected having a focal length $f$, a thin negative lens L—2 of focal length $-2f$ may be located at the principal focus of lens L—1. The distance $H_1H$ will then be $$-\frac{f}{2}$$

and the distance $H_2'H'$ will be $-f$. Then $$S \text{ (or } HH') = \frac{f}{2}$$

Since S (or HH') is the distance by which the system is to be lengthened, S will now be equal to 2.1 inches. From the above relationship selected for the two lenses, $$S = \frac{f}{2}$$

and, therefore, $f=2S$ or $f=4.2$ inches, the focal length of lens L—1.

Since the focal length of lens L—2 is equal to $-2f$, this focal length will be $-2 \times 4.2 = -8.4$ inches.

The lenses L—1 and L—2 will be separated a distance of 4.2 inches since it was stated that the lenses were selected such that the negative lens was placed at the principal focus of the positive lens.

The solution of the example may be checked to see whether it fits all limitations imposed by the general formulas.

$$K = \frac{\text{focal length of lens L-2}}{\text{focal length of lens L-1}}, \quad K = \frac{-8.4}{4.2} = -2$$

$$n = \frac{\text{distance separating L-1 and L-2}}{f} = \frac{4.2}{4.2} = 1$$

Since, in the formulas, the distance from the object (slit $m$) to the anterior vertex of B (or to the nearest point to lens B at which another lens such as L—2 can be mounted) is always taken as unity, the focal length $f$ and the distance $S$ must each first be expressed in terms of this value.

Therefore, for substitution purposes:

$$f = \frac{4.2}{4.2} = 1$$

and $$S = \frac{2.1}{4.2} = 0.5$$

$$S = \frac{-n^2 f}{1+K-n} = \frac{-1 \times 1}{1-2-1} = \frac{-1}{-2} = 0.5$$

and $n=1$
while $1+K=1-2=-1$ $\therefore n > (1+K)$ as required for positive values of $f$ $$\frac{nKf}{1+K-n} = \frac{1 \times (-2) \times 1}{1-2-1} = \frac{-2}{-2} = 1$$

which meets the requirement that $$\frac{nKf}{1+K-n} \text{ (or } -H_2'H') \leqq 1$$

The solution for thick or real lenses differs from the thin lens solution in that the value of S is increased by the sum of the separations of the principal planes of the two lenses. An additional degree of control over the realizable values of S is thus available.

There has thus been described a method of increasing the length of a two stage relay optical system by a desired amount such that the system may be adapted to fit a particular optical instrument. The example disclosed is intended to be illustrative of one embodiment only and it is desired that the invention be limited as defined in the appended claims.

I claim as my invention:

1. A two stage relay optical system comprising an object point, a first positive lens, a diaphragm plate having an aperture therein, a second objective positive lens spaced from said first positive lens at the image point of said object point by said first positive lens, a lens combination comprising a positive lens and a negative lens positioned between said first and second positive lenses, said combination being characterized in that one principal plane thereof is coincident with said aperture, and that the distance S between the principal planes of said lens combination is a positive number equal to the fraction of the focal length $f$, which is $$\frac{-n^2 f}{1+K-n}$$

with the limitations that
when $f$ is positive, $n$ must be $>(1+K)$,
when $f$ is negative, $n$ must be $<(1+K)$,
and $$\frac{nKf}{1-K-n} \leqq 1, \text{ also } -\frac{nKf}{1+K-n} < S$$

where the distance from said aperture to the nearest point to said second positive lens at which another lens can be mounted is taken as a unit distance and where, expressed in terms relative to said unit distance, $f$ is the focal length of the lens in said lens combination nearest said aperture, $n$ is the ratio of the distance between the two lenses of said lens combination to the focal length of the lens in said lens combination nearest said aperture, $nf$ is the distance between the lenses of said lens combination, where K is the ratio of the focal length of the lens of said lens combination farthest from said aperture to the focal length of the lens of said combination nearest said aperture, and $Kf$ is the focal length of the lens in said lens combination farthest from said aperture.

2. A system according to claim 1 in which the lens of said lens combination which is nearest said aperture is a positive lens having a focal length substantially twice the distance between the focal planes of said lens combination, and the other lens of said lens combination is a negative lens situated at the principal focus of said nearest lens and has a focal length twice the focal length of said nearest lens.

3. A system according to claim 2 in which the lens of said lens combination which is nearest said aperture has a focal length of 4.2 inches, and said other lens of said lens combination has a focal length of $-8.4$ inches.

4. A system according to claim 1 in which $f$ is positive and $Kf$ is negative.

LAWRENCE T. SACHTLEBEN.

REFERENCES CITED

The following references are of record in the file of this patent:

UNITED STATES PATENTS

| Number | Name | Date |
|---|---|---|
| 696,788 | Allen | Apr. 1, 1902 |
| 2,171,360 | Strang | Aug. 29, 1939 |
| 2,237,943 | Lihotzky | Apr. 8, 1941 |

FOREIGN PATENTS

| Number | Country | Date |
|---|---|---|
| 21,621 | Great Britain | 1913 |
| 597,354 | Germany | May 25, 1934 |
| 622,046 | Germany | Jan. 3, 1938 |
| 536,706 | Great Britain | May 23, 1941 |